Dec. 12, 1967    N. G. HAYWARD    3,357,039
VACUUM SYSTEM CONTROL
Filed Nov. 29, 1965    2 Sheets-Sheet 1
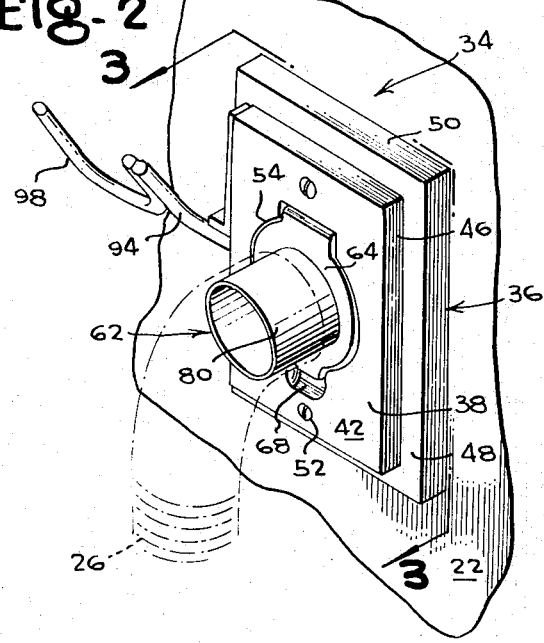
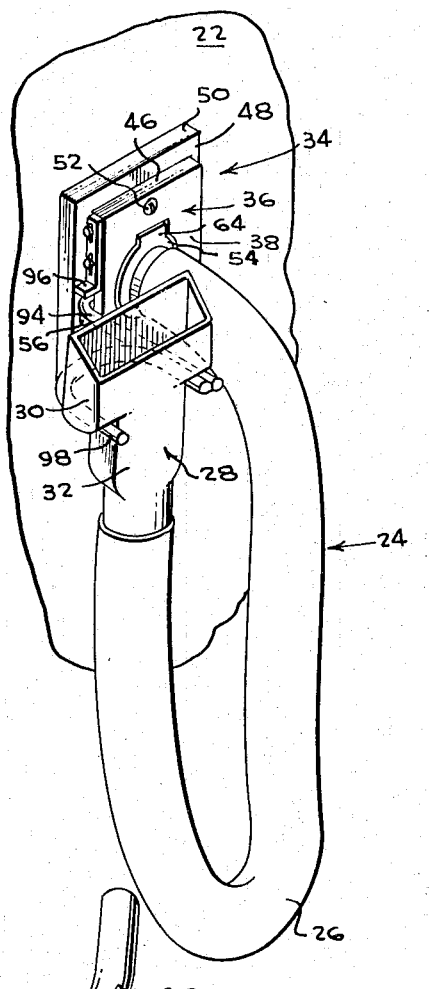
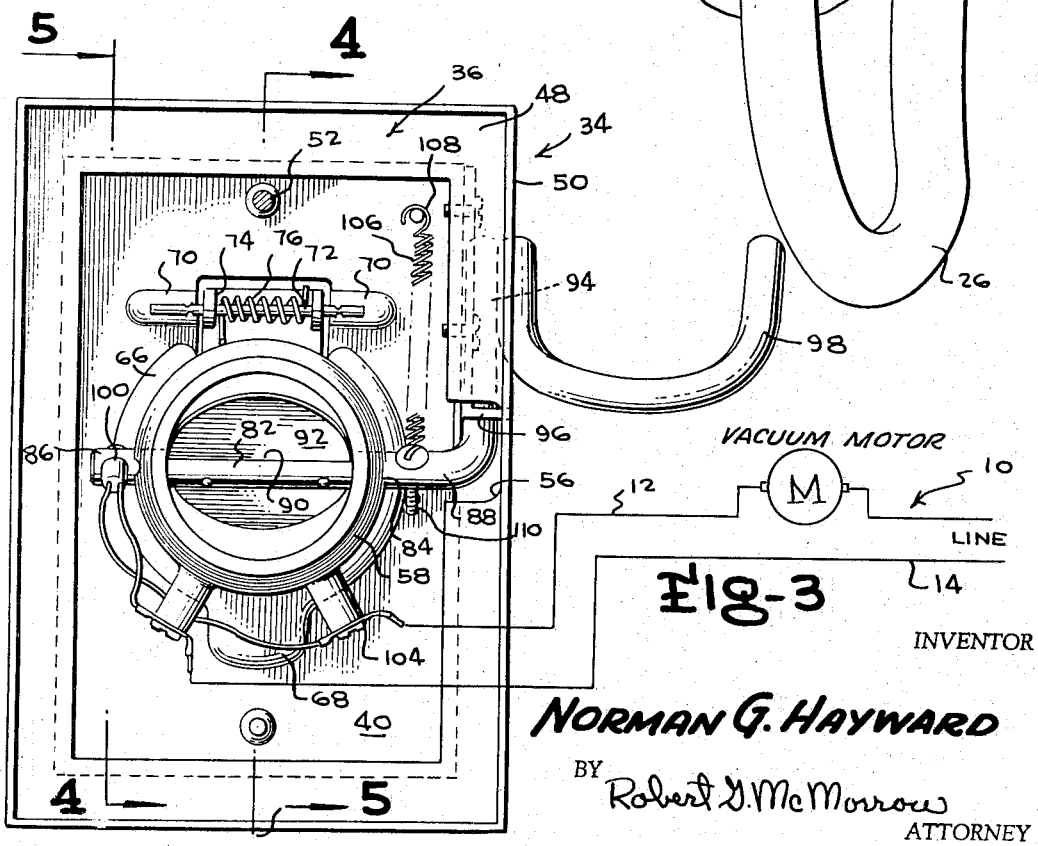
INVENTOR
*Norman G. Hayward*
BY *Robert G. McMorrow*
ATTORNEY

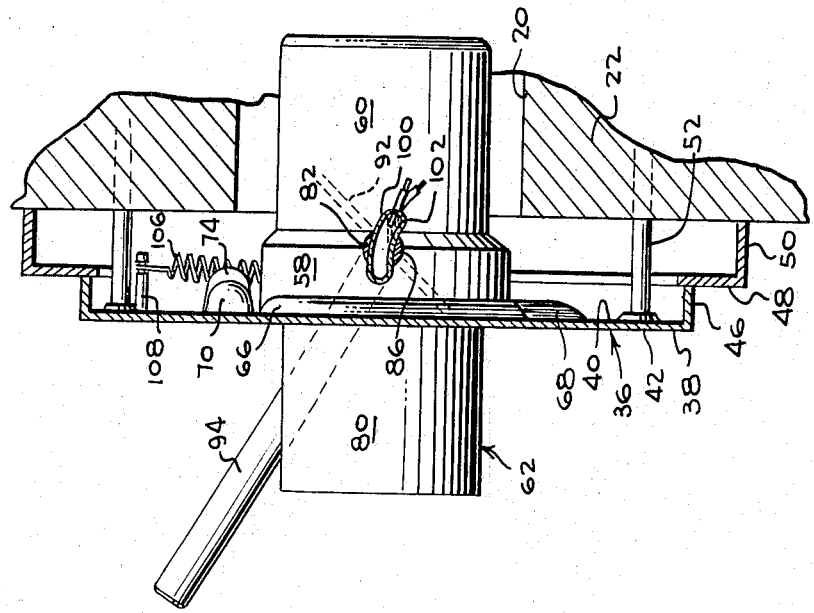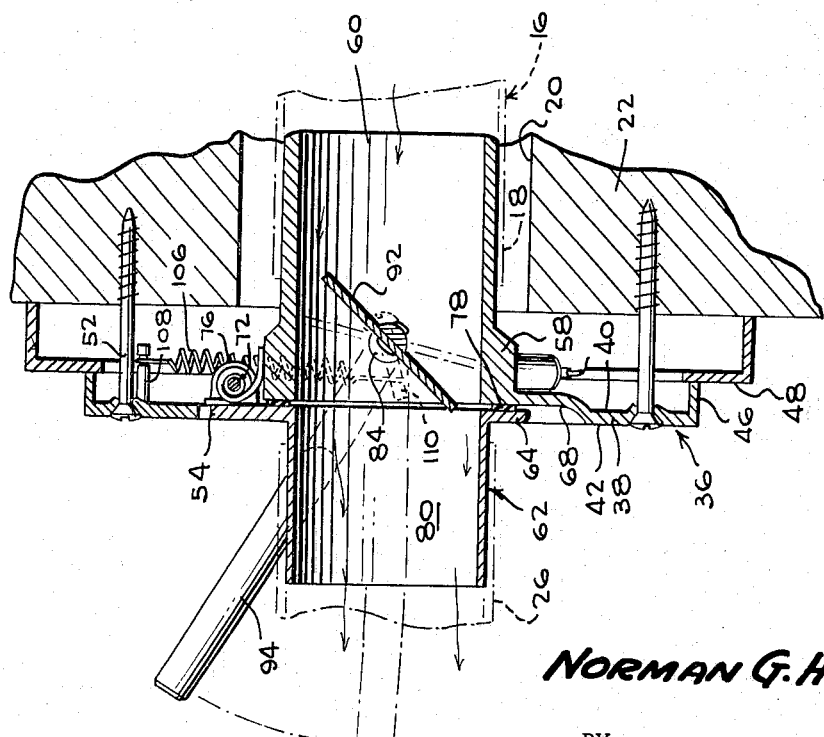

United States Patent Office 3,357,039
Patented Dec. 12, 1967

3,357,039
VACUUM SYSTEM CONTROL
Norman G. Hayward, 6808 Duke Drive,
Alexandria, Va. 22307
Filed Nov. 29, 1965, Ser. No. 510,306
2 Claims. (Cl. 15—314)

ABSTRACT OF THE DISCLOSURE

A combined nozzle outlet and control for a vacuum system, the outlet and control having an implement hanger secured to a lever which operates a switch and a valve.

---

This invention pertains to a control finding particular utility in the environment of a vacuum system of the type often referred to as a centralized vacuum system. It has been known to provide built in vacuum or suction systems for use in the cleaning and maintenance of residences, work establishments, and business places such as barber shops, and the like. These centralized systems generally involve a motor operated pump of some suitable type, and a conduit system with multiple outlets to which individual implements are selectively attachable.

In the employment of systems of the type generally described above, particularly where subjected to intermittent use as in barber shops, the usual control means provided for the systems have proven cumbersome and have resulted in objections to the overall systems. To overcome these objections, it is a basic objective of the present invention to provide an improved automatic control means which operates to activate or deactivate the system responsive to removal or replacement of the implement used therewith from its normal storage position.

A related objective of the invention of primary importance resides in the incorporation in the outlet nozzle assembly of the system of a combined closure valve and switch means which coactively opens the nozzle and activates the system, or closes the nozzle and deactivates the system. Thus, where any individual nozzle is not in use, objectionable feed-back from the operation of other nozzles is effectively precluded, as is sound of operation.

Yet another objective of the invention relates to the provision of a nozzle with implement engagement means thereon, locating the implement in such position that it is instantly available for use.

A still further advantage of the construction herein disclosed is that of providing access to the assembly through the provision of an outwardly hinged cover which reduces the necessity for disassembly for cleaning or repair.

Other and further objects and advantages of the invention will become apparent to those skilled in the art from a consideration of the following specification when read in conjunction with the annexed drawings, in which:

FIGURE 1 is a perspective view of a nozzle control assembly constructed and assembled in accordance with the teachings of the invention;

FIGURE 2 is a second, enlarged perspective view thereof;

FIGURE 3 is a further enlarged view showing the device as viewed from the approximate plane of the line 3—3 of FIGURE 2, looking in the direction of the arrows, and diagrammatically indicating the system per se;

FIGURE 4 is a vertical cross sectional view showing details, taken substantially on the lines 4—4 of FIGURE 3, looking in the direction of the arrows; and FIGURE 5 is another vertical sectional view, taken on the line 5—5 of FIGURE 3, looking in the direction of the arrows.

Referring to the drawings in more detail, disclosed therein is a typical environment of use of this invention. This environment is that of a centralized vacuum system 10 including a motor M with suitable pump means, and electrical lines 12 and 14 included in the control thereof. The system 10 additionally includes suction ducts 16 with terminal ends 18 extending through the wall or partition structures of buildings and being located adjacent openings 20 in the wall 22 thereof. Implements 24 for use in the system 10 may comprise flexible hoses 26 with special head attachments 28 in accordance with specified uses thereof. In FIGURE 1, the attachment 28 is shown as including an enlarged pick-up section 30 and reduced neck 32, for a purpose appearing below.

The control means of this invention involves an outlet nozzle assembly 34 a major component of which is a plate assembly 36. The assembly 36 includes an outer wall 38 with inner and outer sides 40, 42, respectively, connected by peripheral flanges 46 to a step wall 48 arranged substantially parallel to the wall 38. The wall 48 has peripheral flanges 50 contacting the wall 22, and a plate assembly is connected to the wall about the opening 20 therein by fastening means such as screws 52. The plate assembly has a substantially central opening therein comprising an opening 54 formed in the wall 38, and has a slot therein comprising an elongated slot 56 formed in the wall 48 at a location laterally spaced from the opening 54.

An enlarged boss 58 is secured to the inner side 40 of the wall 38 about its opening 54. Integral with or otherwise fixed to the boss 58 is a substantially tubular conduit element 60, extending inwardly, which, as shown in FIGURE 4, is connected to the duct terminal end 18.

For connection with the implement hose 26, the invention includes an outward connection assembly 62 comprising the coupling member 64 shaped to overlie the opening 54, the surrounding area of the wall 38 being recessed as at 66 to provide a seat for the coupling member, and indented at 68. Hinge mounts (FIGURE 3) are provided on the inner side 40 of the wall 38 and a hinge pin 72 extends therebetween. Ears 74 of the coupling member 64 are engaged by the hinge pin, and a torsion spring 76 about the pin and abutting the coupling member and the boss 58 maintains the coupling member in the position shown. The coupling member may be pivoted about the pin against the spring action for access to the conduit 60, and may have a sealing gasket 78 at its contact area. The assembly 62 has an outwardly extending, substantially tubular pipe member 80 connected to the coupling member 64 which, as best shown in FIGURE 4, is arranged coaxial with the conduit 60.

In FIGURE 3 it will be seen that a substantially cylindrical rod 82 extends through transversely aligned, medially arranged apertures 84 formed in the boss 58. The rod has a distal end portion 86 and a proximal end portion 88 located on opposite sides of the conduit. The rod has a substantially central slot 90 therein through which is extended a generally discoidal plate 92 comprising, in effect, a butterfly valve. FIGURE 4 illustrates a closed position of the valve in phantom lines, with its open position shown in full lines. A substantially perpendicularly related control level 94 is secured to the proximal end portion 88 of the rod and extends outwardly of the plate assembly through the slot 56. Upward inclination of the lever is limited by an adjustable stop 96 secured to one of the flanges 46 adjacent the slot, and a generally U-shaped hanger 98 is connected to the lever. The distal end 86 of the rod 82 is apertured to frictionally engage a mercury switch 100 with a conductive fluid 102 therein. Posts 104 are secured to the boss 58 and support wires 12 and 14 in the motor circuit. The ends of the wires extend into the switch 100, and as shown in FIGURE 5, the circuit is completed when the lever is in its upward position and the valve 92 is open. Thus, with the valve open, the circuit is completed, activating the motor.

The lever 94 is normally maintained in its up position by spring 106 connected at one end to a post 108 on the wall 38 and at the other end to a screw 110 in the rod end 88. Spring tension is such that the lever is depressed, closing the valve 92 and deactivating the motor by engagement of the implement head 28 on the hanger 98. Thus, when the implement is in its storage location on the hanger, the conduit is closed and the system circuit broken, but when the implement is removed for use, the conduit is opened and the system completed.

Having described and illustrated one embodiment of this invention in some detail, it will be understood that this description and illustration have been offered by way of example only, and that the invention is to be limited in scope solely by the appended claims.

What is claimed is:

1. In a vacuum system which includes at least one suction duct having a terminal end and an electrical control for said system, a combined nozzle outlet and control comprising:
   a plate assembly mounted adjacent the terminal end of the duct;
   a conduit element connected to the plate assembly and to the terminal end of the duct;
   rod means operatively associated with the conduit element;
   coupling means on the plate assembly for an implement, the implement being positioned for fluid communication and the conduit element and the duct;
   valve means connected to the rod means for selectively opening and closing the conduit;
   electrical switch means operatively associated with the rod means;
   a control lever connected to the rod means;
   spring means connected to the control lever to constantly bias the lever in one direction to a position wherein the switch means is activated and the electrical control operates the system, and wherein the valve means is opened; and
   an implement hanger on the control lever, the engagement of an implement on said hanger moving the lever against the spring bias to deactivate the control and close the valve.

2. In a vacuum system which includes at least one suction duct with terminal ends, a motor, an electrical circuit for control of the motor, a combined nozzle outlet and circuit control comprising:
   a plate assembly mounted adjacent the terminal end of the duct, the plate assembly including inner and outer sides;
   a substantially tubular conduit element secured to the inner side and extending inwardly thereof and being connected to the terminal end of the suction duct;
   the plate assembly having an opening formed therein in alignment with the conduit element and having an elongated slot therein spaced from the opening;
   an outward connection assembly, including a coupling member hingedly connected to the plate adjacent the opening and a substantially tubular pipe member for connection with a pick-up hose, on the outer side of the plate assembly;
   a rod extending thorugh the conduit element and having end portions located exteriorly thereof;
   a butterfly valve on the rod movable therewith from a closed position restricting the conduit, to an open position permitting air and debris passage thereabout;
   one of said end portions of the rod having a mercury switch thereon interposed in the circuit, and the other of said end portions being connected to a substantially perpendicularly related control lever;
   the control lever projecting through the slot in the plate assembly;
   an implement hanger member secured to the control lever outwardly of the plate assembly; and
   spring means connected to the control lever and the plate assembly and constantly biasing the lever in one direction wherein the mercury switch is effective to activate the circuit and operate the system with the valve in its open position, the engagement of an implement on said implement hanger means moving the control arm against the spring bias to deactivate the circuit and close the valve.

References Cited

UNITED STATES PATENTS

| 1,072,783 | 9/1913 | Spencer | 15—315 |
| 1,717,471 | 6/1929 | Spencer. | |
| 3,146,483 | 9/1964 | Bishop | 15—314 |

FOREIGN PATENTS

| 380,239 | 9/1923 | Germany. |

ROBERT W. MICHELL, *Primary Examiner.*